(12) United States Patent
Wei

(10) Patent No.: US 12,105,400 B2
(45) Date of Patent: Oct. 1, 2024

(54) AF MOTOR STRUCTURE, CAMERA DEVICE, AND ELECTRONIC PRODUCT

(71) Applicant: New Shicoh Motor Co., Ltd, Zhejiang (CN)

(72) Inventor: Hua Wei, Zhejiang (CN)

(73) Assignee: New Shicoh Motor Co., Ltd, Zhejiang (CN)

( * ) Notice: Subject to any disclaimer, the term of this patent is extended or adjusted under 35 U.S.C. 154(b) by 475 days.

(21) Appl. No.: 17/612,221

(22) PCT Filed: Aug. 28, 2020

(86) PCT No.: PCT/CN2020/112069
§ 371 (c)(1),
(2) Date: Nov. 18, 2021

(87) PCT Pub. No.: WO2021/258540
PCT Pub. Date: Dec. 30, 2021

(65) Prior Publication Data
US 2022/0308422 A1    Sep. 29, 2022

(30) Foreign Application Priority Data

Jun. 23, 2020  (CN) .......................... 202010577832.5

(51) Int. Cl.
*G03B 13/36* (2021.01)
*H02K 41/035* (2006.01)

(52) U.S. Cl.
CPC ......... *G03B 13/36* (2013.01); *H02K 41/0354* (2013.01)

(58) Field of Classification Search
CPC ............ G03B 13/36; G03B 2205/0046; G03B 2205/0069; G03B 3/10; G03B 5/00;
(Continued)

(56) References Cited

U.S. PATENT DOCUMENTS

| 11,307,486 B2 * | 4/2022 | Jung ...................... H04N 23/00 |
| 2020/0355985 A1 * | 11/2020 | Jung ...................... H04N 23/60 |

(Continued)

FOREIGN PATENT DOCUMENTS

| CN | 207408721 | 5/2018 |
| CN | 109560681 | 4/2019 |

(Continued)

OTHER PUBLICATIONS

"International Search Report (Form PCT/ISA/210) of PCT/CN2020/112069," mailed on Mar. 23, 2021, pp. 1-5.

(Continued)

*Primary Examiner* — William R Alexander
(74) *Attorney, Agent, or Firm* — JCIP GLOBAL INC.

(57) ABSTRACT

Disclosed are an AF (autofocus) motor structure, a camera device, and an electronic product. The AF motor structure includes a base, a housing, a bracket, a main carrier, and a lens, the bracket is provided with a main coil for driving the main carrier to move, and the main carrier is provided with a magnet corresponding to the main coil; the main carrier is provided with a continuous zoom assembly that drives the lens to move, the continuous zoom assembly includes a sub-carrier movable relative to the main carrier in the sliding direction of the main carrier and a sub-coil disposed on the sub-carrier, the lens is connected to the sub-carrier, and the sub-coil corresponds to the magnet.

9 Claims, 7 Drawing Sheets

(58) Field of Classification Search
CPC .............. G03B 30/00; H02K 41/0354; H02K 41/0356; H02K 41/02; H02K 33/00; G02B 7/09
USPC ......................................................... 359/824
See application file for complete search history.

(56) References Cited

U.S. PATENT DOCUMENTS

| | | | |
|---|---|---|---|
| 2020/0409166 A1* | 12/2020 | Park | G03B 3/10 |
| 2022/0206366 A1* | 6/2022 | Jung | G03B 5/00 |
| 2023/0384611 A1* | 11/2023 | Park | G02B 7/09 |

FOREIGN PATENT DOCUMENTS

| | | |
|---|---|---|
| CN | 110543060 | 12/2019 |
| CN | 110838775 | 2/2020 |
| CN | 210136350 | 3/2020 |
| CN | 111183384 | 5/2020 |
| JP | 2017167193 | 9/2017 |

OTHER PUBLICATIONS

"Written Opinion of the International Searching Authority (Form PCT/ISA/237) of PCT/CN2020/112069," mailed on Mar. 23, 2021, pp. 1-3.

* cited by examiner

AF MOTOR STRUCTURE, CAMERA DEVICE, AND ELECTRONIC PRODUCT

CROSS-REFERENCE TO RELATED APPLICATION

This application is a 371 of international application of PCT application serial no. PCT/CN2020/112069, filed on Aug. 28, 2020, which claims the priority benefit of China application no. 202010577832.5, filed on Jun. 23, 2020. The entirety of each of the above-mentioned patent applications is hereby incorporated by reference herein and made a part of this specification.

TECHNICAL FIELD

The present invention relates to the field of camera equipment, in particular to an AF motor structure, a camera device, and an electronic product.

DESCRIPTION OF RELATED ART

In recent years, autofocus (AF) technology has been widely used in imaging systems of mobile phones, tablets, and notebook computers. AF motors have almost become the basic configuration of such electronic products. Voice coil motors used for autofocus have shown a rapid development trend.

The existing AF motor mainly includes a base, a housing, a bracket, a magnet, a carrier, a coil, an upper spring, a lower spring, etc., and its focus is achieved by the movement of the carrier relative to the base.

The existing AF motor can only achieve sequential focus, but cannot achieve continuous and precise focus. In addition, the lens of the existing AF motor is independent and fixed to the carrier, so it is immovable. As a result, the product cannot achieve continuous optical zoom, has poor focus resolution, and cannot achieve an optical zoom effect or a better resolution.

Therefore, it is necessary to improve such a structure to overcome the above shortcomings.

SUMMARY

The objective of the present invention is to provide an AF (autofocus) motor structure, a camera device, and an electronic product, in which a structure for driving a lens is added to achieve optically continuous zoom and improve optical resolution.

The above technical objective of the present invention is achieved through the following technical solutions: an AF motor structure includes a base, a housing, a bracket, a main carrier, and a lens, the bracket is provided with a main coil for driving the carrier to move, and the main carrier is provided with a magnet corresponding to the main coil; the main carrier is provided with a continuous zoom assembly that drives the lens to move, the continuous zoom assembly includes a sub-carrier movable relative to the main carrier in the sliding direction of the main carrier and a sub-coil disposed on the sub-carrier, the lens is connected to the sub-carrier, and the sub-coil corresponds to the magnet.

A further configuration of the present invention is: the lower end face of the main carrier is provided with a ring-shaped movable groove for accommodating the sub-carrier, and the sub-carrier is located in the movable groove and is movable relative to the main carrier.

A further configuration of the present invention is: the base is connected with a lower spring, and the lower spring includes an outer fixing portion fixedly connected to the base, a middle fixing portion fixedly connected to the main carrier, an inner fixing portion fixedly connected to the sub-carrier, a first elastic portion disposed between the outer fixing portion and the inner fixing portion, and a second elastic portion disposed between the middle fixing portion and the inner fixing portion.

A further configuration of the present invention is: a plurality of connecting blocks connected to the end of the sub-carrier facing the bottom surface of the movable groove are fixed to a side wall of the lens, the bottom surface of the movable groove is provided with a plurality of mounting grooves corresponding to the connecting blocks, and the mounting grooves penetrate the bottom surface of the movable groove.

A further configuration of the present invention is: there are two main coils symmetrically arranged on two sides of the main carrier, there are two groups of magnets corresponding to the main coils respectively, and the sub-coils are arranged around the sub-carriers.

A further configuration of the present invention is: the bracket is integrally formed on the base, and the bracket is provided with an assembly groove for installing the main coil.

A further configuration of the present invention is: the middle fixing portion is fixedly connected to the end face of the main carrier facing the base, and the inner fixing portion is fixedly connected to the end face of the sub-carrier facing the base.

The base is provided with an outer positioning block for positioning the outer fixing portion, the outer fixing portion is provided with an outer positioning groove clamped with the outer positioning block, the main carrier is provided with a middle positioning block for positioning the middle fixing portion, the middle fixing portion is provided with a middle positioning groove clamped with the middle positioning block, and the sub-carrier is provided with an inner positioning block that abuts against a side wall of the inner fixing portion and positions the inner fixing portion.

A further configuration of the present invention is: a camera device includes the above-mentioned AF motor structure.

A further configuration of the present invention is: an electronic product includes the above-mentioned AF motor structure.

To sum up, the present invention has the following beneficial effects:

When focusing, the main coil is first powered on to drive the main carrier to move, and the main carrier drives the sub-carrier to move synchronously to achieve preliminary focus. Then, the sub-coil is powered on to drive the sub-carrier to move relative to the main carrier, and the sub-carrier drives the lens to move synchronously to achieve continuous focus, thereby improving optically continuous zoom of the product and improving optical resolution. In addition, the main coil and the sub-coil share the magnet, which can effectively reduce the size and weight of the present application.

When the main carrier moves, the first elastic portion is elastically deformed, and the sub-carrier is driven to move synchronously through the second elastic portion and the inner fixing portion; when the sub-carrier moves relative to the main carrier, the second elastic portion is elastically deformed; and after the use, the main carrier and the sub-carrier can be reset by the first elastic portion and the second elastic portion, to ensure that the present application can realize a continuous zoom function.

When the lens is assembled, the connecting blocks of the lens are put in from the mounting grooves and abut and adhere to the upper end face of the sub-carrier, to install and fix the lens to the sub-carrier, which improves the assembly convenience.

Names of corresponding parts indicated by numerals in the figures: 1—base; 2—housing; 3—bracket; 4—main carrier; 5—lens; 6—main coil; 7—magnet; 8—assembly groove; 9—sub-carrier; 10—sub-coil; 11—movable groove; 12—lower spring; 13—outer fixing portion; 14—middle fixing portion; 15—inner fixing portion; 16—first elastic portion; 17—second elastic portion; 18—outer positioning block; 19—outer positioning groove; 20—middle positioning block; 21—middle positioning groove; 22—inner positioning block; 23—connecting block; 24—mounting groove.

DESCRIPTION OF THE EMBODIMENTS

In order to make the technical means, creative features, objectives and effects of the present invention easy to understand, the present invention will be further explained below in conjunction with the drawings and specific embodiments.

Figure 1:
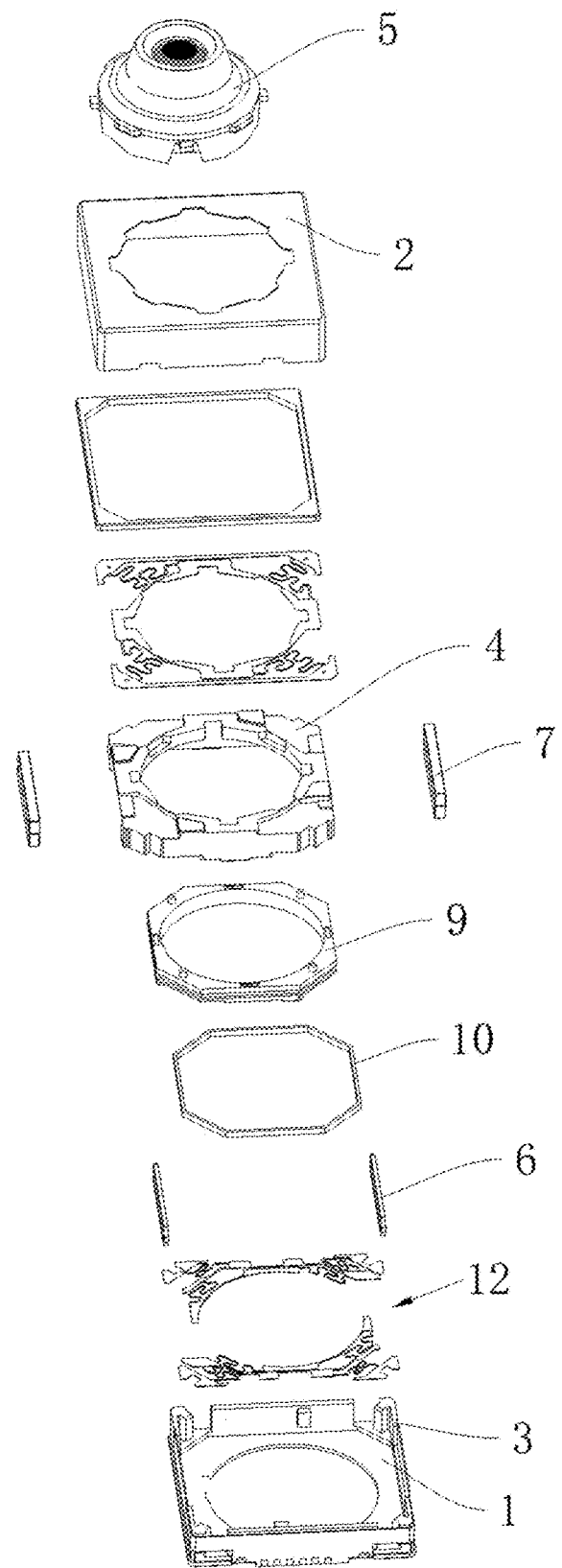
FIG. 1 is an exploded schematic diagram of Embodiment 1.
Figure 2:
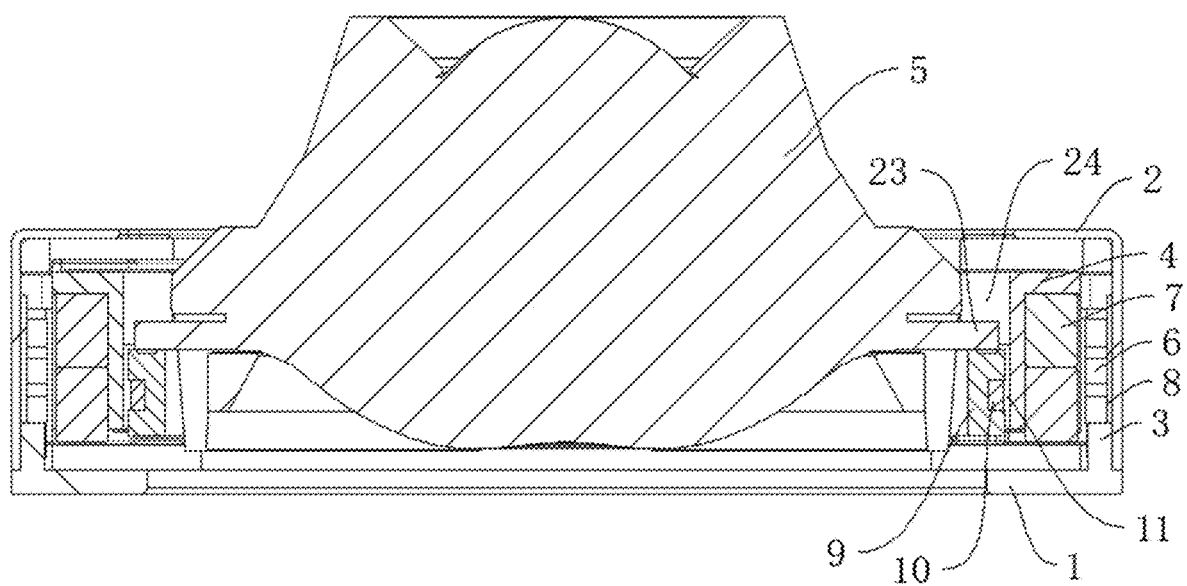
FIG. 2 is a first cross-sectional view of Embodiment 1.
Figure 3:
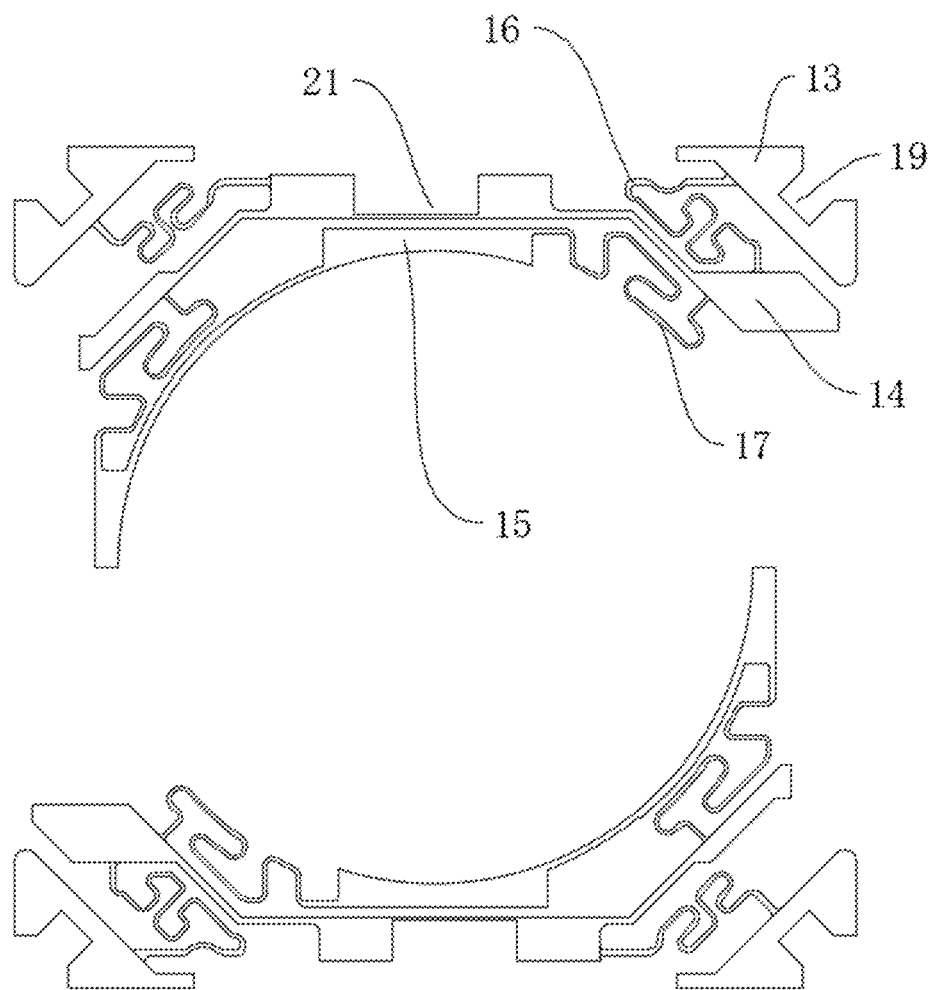
FIG. 3 is a schematic diagram of a lower spring.
Figure 4:
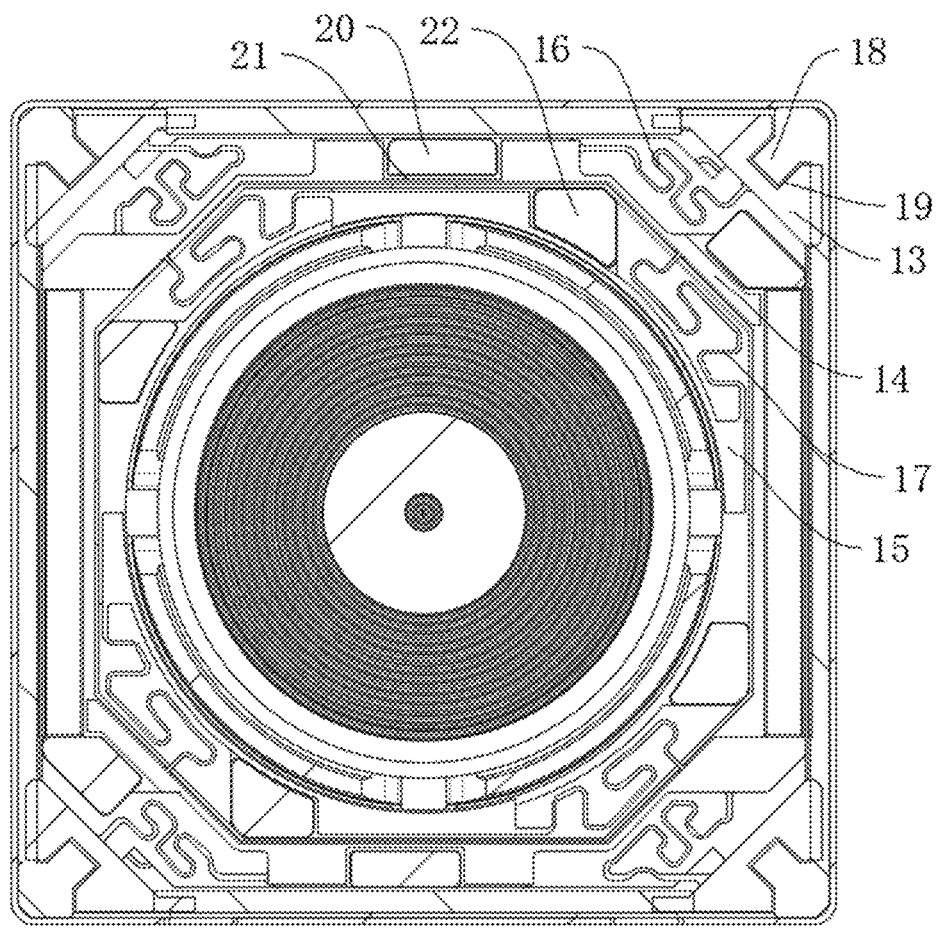
FIG. 4 is a second cross-sectional view of Embodiment 1, showing the assembly of the lower spring with a base, a main carrier, and a sub-carrier.
Figure 5:
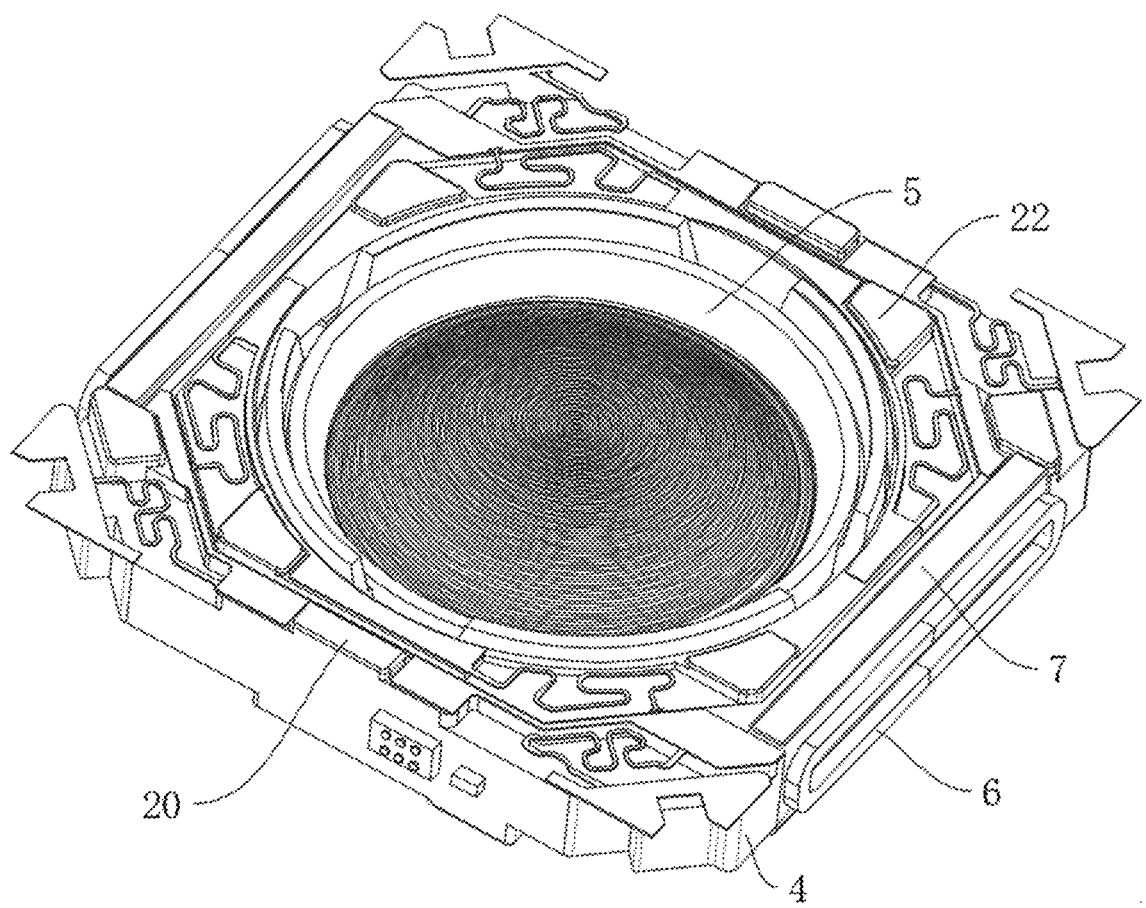
FIG. 5 is a schematic assembly diagram of the lower spring and the main carrier in Embodiment 1.
Figure 6:
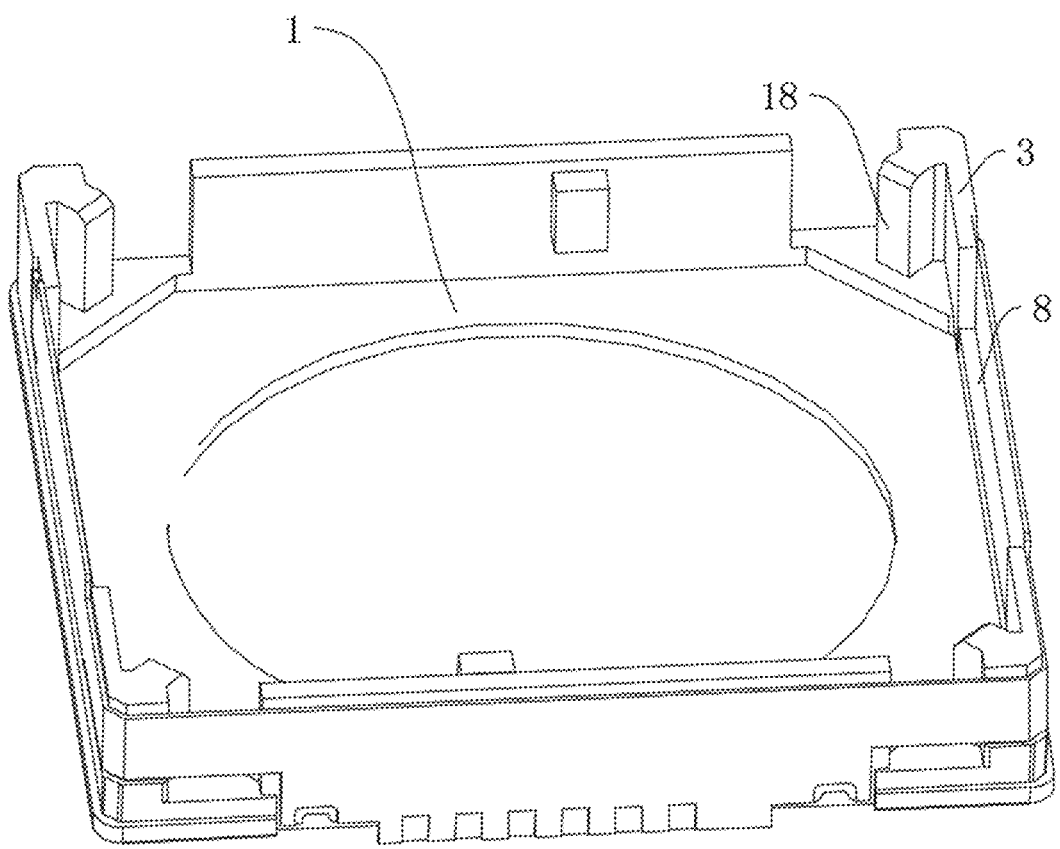
FIG. 6 is a schematic diagram of the base.
Figure 7:
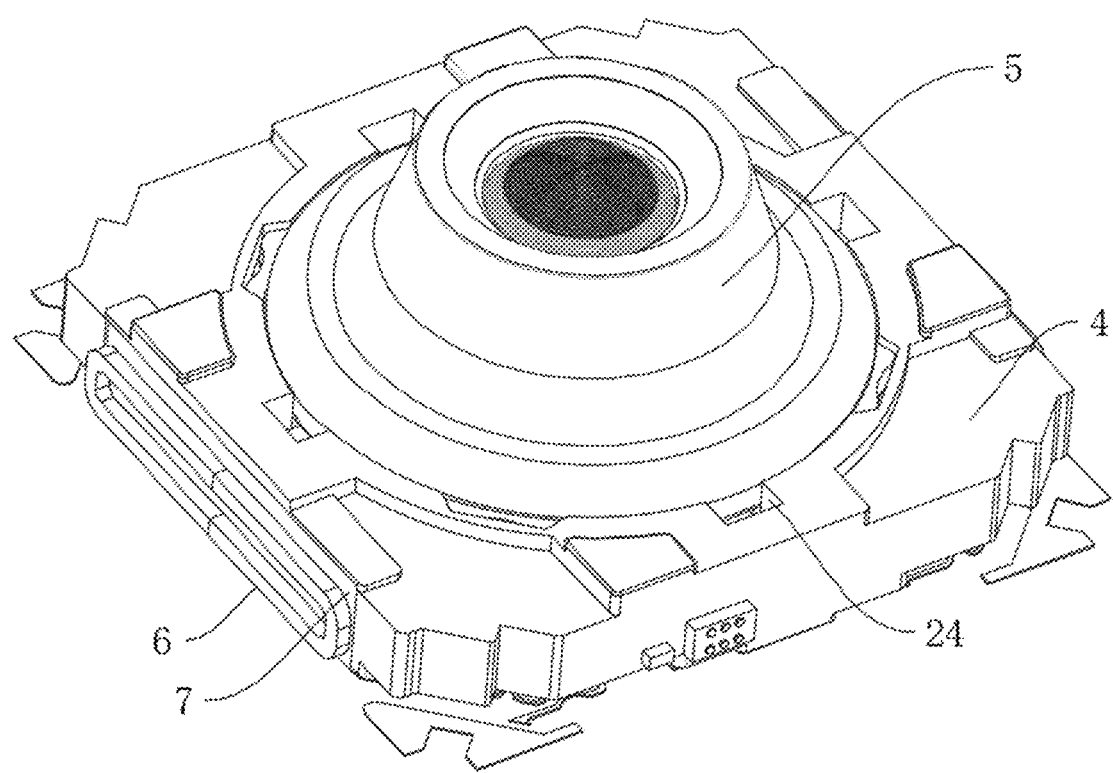
FIG. 7 is a schematic assembly diagram of a lens and the main carrier in Embodiment 1.

Embodiment 1: As shown in FIGS. 1 to 7, an AF (autofocus) motor structure proposed by the present invention includes a base 1, a housing 2, a bracket 3, a main carrier 4, and a lens 5. The bracket 3 is provided with a main coil 6 for driving the carrier 4 to move, and the main carrier 4 is provided with a magnet 7 corresponding to the main coil 6. In the present application, the bracket 3 is integrally formed on the base 1, and the bracket 3 is provided with an assembly groove 8 for installing the main coil 6.

The main carrier 4 is provided with a continuous zoom assembly that drives the lens 5 to move, the continuous zoom assembly includes a sub-carrier 9 movable relative to the main carrier 4 in the sliding direction of the main carrier 4 and a sub-coil 10 disposed on the sub-carrier 9, the lens 5 is connected to the sub-carrier 9, and the sub-coil 10 corresponds to the magnet 7. In addition, the lower end face of the main carrier 4 is provided with a movable groove 11 for the sub-carrier 9 to move, the movable groove 11 is arranged in a ring shape, and the sub-carrier 9 is located in the movable groove 11 and is movable relative to the main carrier 4, that is, the height of the sub-carrier 9 is less than the depth of the movable groove 11.

When focusing, the main coil 6 is first powered on to drive the main carrier 4 to move, and the main carrier 4 drives the sub-carrier 9 to move synchronously to achieve preliminary focus. Then, the sub-coil 10 is powered on to drive the sub-carrier 9 to move relative to the main carrier 4, and the sub-carrier 9 drives the lens 5 to move synchronously to achieve continuous focus, thereby improving optically continuous zoom of the product and improving optical resolution. In addition, the main coil and the sub-coil 10 share the magnet 7, which can effectively reduce the size and weight of the present application.

In order to ensure that the main carrier 4 drives the sub-carrier 9 to move synchronously and realize the movement of the sub-carrier 9 relative to the main carrier 4, the base 1 is connected with a lower spring 12, and the lower spring 12 includes an outer fixing portion 13 fixedly connected to the base 1, a middle fixing portion 14 fixedly connected to the main carrier 4, an inner fixing portion 15 fixedly connected to the sub-carrier 9, a first elastic portion 16 disposed between the outer fixing portion 13 and the inner fixing portion 15, and a second elastic portion 17 disposed between the middle fixing portion 14 and the inner fixing portion 15; and the middle fixing portion 14 and the inner fixing portion 15 are fixedly connected to the lower end faces of the main carrier 4 and the sub-carrier 9 respectively. Then, when the main carrier 4 moves, the first elastic portion 16 is elastically deformed, and the sub-carrier 9 is driven to move synchronously through the second elastic portion 17 and the inner fixing portion 15; when the sub-carrier 9 moves relative to the main carrier 4, the second elastic portion 17 is elastically deformed; and after the use, the main carrier 4 and the sub-carrier 9 can be reset by the first elastic portion 16 and the second elastic portion 17, to ensure that the present application can realize a continuous zoom function.

In order to accurately position the lower spring 12, the base 1 is provided with an outer positioning block 18 for positioning the outer fixing portion 13, the outer fixing portion 13 is provided with an outer positioning groove 19 clamped with the outer positioning block 18, the main carrier 4 is provided with a middle positioning block 20 for positioning the middle fixing portion 14, the middle fixing portion 14 is provided with a middle positioning groove 21 clamped with the middle positioning block 20, and the sub-carrier 9 is provided with an inner positioning block 22 that abuts against a side wall of the inner fixing portion 15 and positions the inner fixing portion 15.

In order to facilitate the assembly of the lens 5 onto the sub-carrier 9 of the AF motor, a plurality of connecting blocks 23 connected to the end of the sub-carrier 9 facing the bottom surface of the movable groove 11 are fixed to the side wall of the lens 5, the bottom surface of the movable groove 11 is provided with a plurality of mounting grooves 24 corresponding to the connecting blocks 23, and the mounting grooves 24 penetrate the bottom surface of the movable groove 11. When the lens 5 is assembled, the connecting blocks 23 of the lens 5 are put in from the mounting grooves 24 and abut and adhere to the upper end face of the sub-carrier 9, to install and fix the lens 5 to the sub-carrier 9, which improves the assembly convenience.

Embodiment 2: A camera device includes the AF motor structure described in Embodiment 1.

Embodiment 3: An electronic product includes the camera device described in Embodiment 2.

Herein, the orientations or positional relationships indicated by the terms "upper", "lower", "front", "rear", "left", "right", "top", "bottom", "inner", "outer", "vertical", "horizontal", etc. are based on the orientations or positional relationships shown in the drawings, are only for the clarity of technical solutions and the convenience of description, and therefore cannot be understood as limitations on the present invention.

Herein, the terms "include", "comprise" or any other variants thereof are intended to encompass non-exclusive inclusion, in addition to including those elements listed, but also other elements that are not explicitly listed.

The basic principles, main features and advantages of the present invention are shown and described above. Those skilled in the art should understand that the present invention is not limited by the above embodiments, the above embodiments and the description only illustrate the principles of the present invention, the present invention will have various changes and improvements without departing from the spirit and scope of the present invention, and these changes and improvements all fall within the scope of the present invention. The scope of the present invention is defined by the appended claims and equivalents thereof.

What is claimed is:

1. An AF (autofocus) motor structure, comprising a base, a housing, a bracket, a main carrier, and a lens, wherein the bracket is provided with a main coil for driving the carrier to move, and the main carrier is provided with a magnet corresponding to the main coil;

the main carrier is provided with a continuous zoom assembly that drives the lens to move, the continuous zoom assembly comprises a sub-carrier movable relative to the main carrier in the sliding direction of the main carrier and a sub-coil disposed on the sub-carrier, the lens is connected to the sub-carrier, and the sub-coil corresponds to the magnet, wherein the lower end face of the main carrier is provided with a ring-shaped movable groove for accommodating the sub-carrier, and the sub-carrier is located in the movable groove and is movable relative to the main carrier.

2. The AF motor structure according to claim 1, wherein the base is connected with a lower spring, and the lower spring comprises an outer fixing portion fixedly connected to the base, a middle fixing portion fixedly connected to the main carrier, an inner fixing portion fixedly connected to the sub-carrier, a first elastic portion disposed between the outer fixing portion and the inner fixing portion, and a second elastic portion disposed between the middle fixing portion and the inner fixing portion.

3. The AF motor structure according to claim 1, wherein a plurality of connecting blocks connected to the end of the sub-carrier facing the bottom surface of the movable groove are fixed to a side wall of the lens, the bottom surface of the movable groove is provided with a plurality of mounting grooves corresponding to the connecting blocks, and the mounting grooves penetrate the bottom surface of the movable groove.

4. The AF motor structure according to claim 1, wherein there are two main coils symmetrically arranged on two sides of the main carrier, there are two groups of magnets corresponding to the main coils respectively, and the sub-coils are arranged around the sub-carriers.

5. The AF motor structure according to claim 4, wherein the bracket is integrally formed on the base, and the bracket is provided with an assembly groove for installing the coil.

6. The AF motor structure according to claim 2, wherein the middle fixing portion is fixedly connected to the end face of the main carrier facing the base, and the inner fixing portion is fixedly connected to the end face of the sub-carrier facing the base.

7. The AF motor structure according to claim 6, wherein the base is provided with an outer positioning block for positioning the outer fixing portion, the outer fixing portion is provided with an outer positioning groove clamped with the outer positioning block, the main carrier is provided with a middle positioning block for positioning the middle fixing portion, the middle fixing portion is provided with a middle positioning groove clamped with the middle positioning block, and the sub-carrier is provided with an inner positioning block that abuts against a side wall of the inner fixing portion and positions the inner fixing portion.

8. A camera device, comprising the AF motor structure according to claim 1.

9. An electronic product, comprising the camera device according to claim 8.

* * * * *